United States Patent
Wang et al.

(10) Patent No.: US 12,222,867 B2
(45) Date of Patent: *Feb. 11, 2025

(54) PROCESSOR, COMPUTER SYSTEM, AND METHOD FOR FLUSHING HIERARCHICAL CACHE STRUCTURE BASED ON A DESIGNATED KEY IDENTIFICATION CODE AND A DESIGNATED ADDRESS

(71) Applicant: Shanghai Zhaoxin Semiconductor Co., Ltd., Shanghai (CN)

(72) Inventors: Weilin Wang, Beijing (CN); Yingbing Guan, Shanghai (CN); Minfang Zhu, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 221 days.

This patent is subject to a terminal disclaimer.

(21) Appl. No.: 18/046,642

(22) Filed: Oct. 14, 2022

(65) Prior Publication Data
US 2023/0161709 A1    May 25, 2023

(30) Foreign Application Priority Data
Nov. 19, 2021    (CN) .......................... 202111374225.X

(51) Int. Cl.
*G06F 12/08* (2016.01)
*G06F 12/0891* (2016.01)
*G06F 21/60* (2013.01)

(52) U.S. Cl.
CPC ........ *G06F 12/0891* (2013.01); *G06F 21/602* (2013.01); *G06F 2212/1052* (2013.01)

(58) Field of Classification Search
CPC .... G06F 12/08; G06F 12/0891; G06F 21/602; G06F 2212/1052; G06F 12/00
See application file for complete search history.

(56) References Cited

U.S. PATENT DOCUMENTS

| 8,930,629 B2 * | 1/2015 | Ghai ................... G06F 12/0817 |
| | | 711/119 |
| 10,977,192 B1 | 4/2021 | Habusha |

(Continued)

FOREIGN PATENT DOCUMENTS

| EP | 3015980 A1 * | 5/2016 | ............. G06F 12/08 |
| EP | 3757767 A1 * | 12/2020 | ......... G06F 12/0804 |

(Continued)

OTHER PUBLICATIONS

S. Yamaguchi, T. Ishihara and H. Yasuura, "A single cycle accessible two-level cache architecture for reducing the energy consumption of embedded systems," 2008 International SoC Design Conference, Busan, Korea (South), 2008, pp. I-188-I-191.*

(Continued)

*Primary Examiner* — Pierre Michel Bataille
(74) *Attorney, Agent, or Firm* — McClure, Qualey & Rodack, LLP

(57) ABSTRACT

A technology flushing a hierarchical cache structure based on a designated key identification code and a designated address. A processor includes a first core and a last level cache (LLC). The first core includes a decoder, a memory ordering buffer, and a first in-core cache module. In response to an Instruction Set Architecture (ISA) instruction that requests to flush a hierarchical cache structure according to a designated key identification code and a designated address, the decoder outputs at least one microinstruction. According to the at least one microinstruction, a flushing request with the designated key identification code and the designated address is provided to the first in-core cache module through the memory ordering buffer, and then the first in-core cache module provides the LLC with the flushing request, so that the LLC flushes its matching cache (Continued)

line which matches the designated key identification code and the designated address.

23 Claims, 4 Drawing Sheets

(56) References Cited

U.S. PATENT DOCUMENTS

| | | |
|---|---|---|
| 2002/0069328 A1 | 6/2002 | Chauvel |
| 2005/0027964 A1 | 2/2005 | Sperber |
| 2011/0238947 A1 | 9/2011 | Nishiguchi |
| 2013/0262777 A1* | 10/2013 | Ghai .................. G06F 12/0815 |
| | | 711/E12.071 |
| 2013/0339657 A1 | 12/2013 | Greiner |
| 2014/0181388 A1 | 6/2014 | Mohandru |
| 2015/0242319 A1 | 8/2015 | Evans |
| 2017/0262369 A1 | 9/2017 | Murphy |
| 2018/0329829 A1 | 11/2018 | Zmudzinski |
| 2020/0057664 A1 | 2/2020 | Durham |
| 2020/0202012 A1 | 6/2020 | Shanbhogue |
| 2020/0409844 A1 | 12/2020 | Sanjeepan |
| 2021/0286755 A1* | 9/2021 | Vorbach .................. G06F 9/345 |
| 2021/0406195 A1 | 12/2021 | Vakharwala |
| 2022/0066947 A1 | 3/2022 | Pape |
| 2023/0161704 A1 | 5/2023 | Wang |

FOREIGN PATENT DOCUMENTS

| | | | | |
|---|---|---|---|---|
| GB | 2502662 A | * | 12/2013 | ......... G06F 12/0804 |
| WO | WO-2010142432 A2 | * | 12/2010 | ......... G06F 12/0811 |

OTHER PUBLICATIONS

L. Benini, A. Macii, E. Macii and M. Poncino, "Increasing energy efficiency of embedded systems by application-specific memory hierarchy generation," in IEEE Design & Test of Computers, vol. 17, No. 2, pp. 74-85, Apr.-Jun. 2000.*

Cloutier, F.; "INVD—Invalidate Internal Caches;" Mar. 2023; pp. 1-2 https://web.archive.org/web/20190812221944/https://www.felixcloutier.com/x86/invd.

Notice of Allowance mailed Nov. 7, 2023, issued in U.S. Appl. No. 18/046,634 (copy not provided).

Notice of Allowance mailed Jan. 11, 2024, issued in U.S. Appl. No. 18/046,618 (copy not provided).

* cited by examiner

PROCESSOR, COMPUTER SYSTEM, AND METHOD FOR FLUSHING HIERARCHICAL CACHE STRUCTURE BASED ON A DESIGNATED KEY IDENTIFICATION CODE AND A DESIGNATED ADDRESS

CROSS REFERENCE TO RELATED APPLICATIONS

This application claims priority of China Patent Application No. 202111374225.X, filed on Nov. 19, 2021, the entirety of which is incorporated by reference herein.

BACKGROUND

Technical Field

The present application relates to management technology for a hierarchical cache structure of a processor.

Description of the Related Art

In a computer system, memory devices may be classified into tiers. The higher-level memory has higher speed, lower latency, but lower capacity. The memory hierarchy of most computer systems has the following four levels (ordered from top to bottom): registers; caches; a system memory (a main memory, such as a DRAM); and disks (SSD or HD).

In particular, caches may also be arranged hierarchically. From the high-access speed to the low-access speed, the caches include: the level 1 cache (L1); the level 2 cache (L2); and the level 3 cache (L3, also known as the last level cache, or LLC for short). The management of the hierarchical cache structure will significantly affect system performance.

In order to protect confidential and sensitive data, a total memory encryption technology has been developed to use different keys to encrypt different parts of a system memory. Thus, the management of the system memory depends on the keys (in granularity of keys). The management with granularity of keys, however, is not applied to the hierarchical cache structure, so an operating system (OS) is incapable of managing the hierarchical cache structure in granularity of keys.

BRIEF SUMMARY

This case proposes a management technology that manages a hierarchical cache structure in granularity of keys.

A processor in accordance with an exemplary embodiment of the present application includes a first core, and a last-level cache. The first core includes a decoder, a memory ordering buffer (MOB for short), and a first in-core cache module. In response to an Instruction Set Architecture (ISA) instruction that requests to flush a hierarchical cache structure according to a designated key identification code and a designated address, the decoder outputs at least one microinstruction. According to the at least one microinstruction, a flushing request with the designated key identification code and the designated address is provided to the first in-core cache module through the memory ordering buffer, and then the first in-core cache module further provides the flushing request to the last-level cache. In response to the flushing request, the last-level cache searches itself for a matching cache line that matches the designated key identification code and the designated address, and flushes the matching cache line.

A detailed description is given in the following embodiments with reference to the accompanying drawings.

BRIEF DESCRIPTION OF THE DRAWINGS

The present application can be more fully understood by reading the subsequent detailed description and examples with references made to the accompanying drawings, wherein.

DETAILED DESCRIPTION

The following description is made for the purpose of illustrating the general principles of the invention and should not be taken in a limiting sense. The scope of the invention is best determined by reference to the appended claims.

At present, a computer system usually has a total memory encryption design, which uses different keys to encrypt the different parts of a system memory to increase the security of the computer system. The keys for the encryption of the different storage areas of the system memory each may be represented by a particular key identification code (key ID). The computer system may use a key table to store the keys of the different key IDs. During data encryption, the key table is checked to obtain the key corresponding to the entered key ID.

Considering the multi-key encryption of the system memory, in the present application, the key ID is one of the parameters used in the management of a hierarchical cache structure. The hierarchical cache structure may include level 1, level 2 and level 3 caches (L1, L2 and L3). Based on the total memory encryption, the hierarchical cache structure in the present application may be flushed according to a designated key ID and a designated address.

In an exemplary embodiment, the present application proposes a processor, which uses an instruction set architecture (ISA) instruction CFLUSHKEYID to manage its hierarchical cache structure to flush a cache line matching both a designated key ID Key_ID_S and a designated address Addr_S.

A modern operating system generally uses a virtual memory management mechanism, and a memory management unit (MMU) of a central processing unit (CPU) supports the transform from a virtual address (VA) to a physical address (PA). The designated address (Addr_S) designated in the instruction CFLUSHKEYID may be a designated physical address (PA) or a designated virtual address (VA). If the designated address is a virtual address, the memory management unit (such as a memory ordering buffer) operates to transform the virtual address into a physical address, and then performs a cache line flushing operation. If the updated content in the matching cache line has not been written back to the system memory, the matching cache line has to be written back to the system memory prior to being flushed. The instruction set architecture supported by the processor is not limited, it may be x86 architecture, Advanced RISC Machine (abbreviated as ARM) architecture, MIPS (Microprocessor without Interlocked Pipeline Stages) instruction set architecture, RISC-V (RISC-Five) Instruction Set Architecture, SPARC Instruction Set Architecture, IBM Power Instruction Set Architecture, or others.

Figure 1:
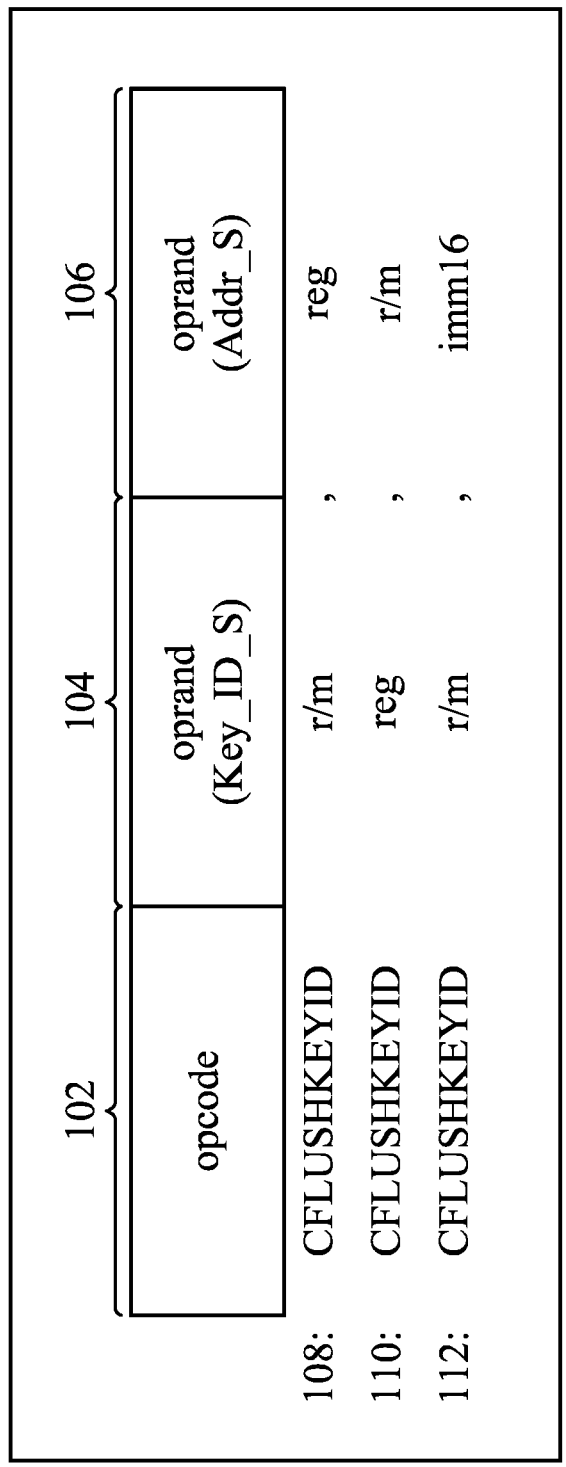
FIG. 1 shows an instruction format for the ISA instruction CFLUSHKEYID in accordance with an exemplary embodiment of the present application.

FIG. 1 shows an instruction format for the ISA instruction CFLUSHKEYID in accordance with an exemplary embodiment of the present application. In addition to the opcode 102 for recognizing the instruction CFLUSHKEYID, two operands 104 and 106 are required. The operand 104 indicates the designated key ID (Key_ID_S). The operand 106 indicates the designated address (Addr_S). The processor compares the designated key ID (Key_ID_S) with the key ID (Key_ID) obtained from each cache line, matching the designated address (Addr_S), in the hierarchical cache structure. If the obtained key ID Key_ID equals to the designated key ID Key_ID_S, the corresponding cache line is flushed. The operands 104 and 106 may be implemented in various ways. Referring to the instruction format 108, corresponding to the ISA instruction CFLUSHKEYID, the operand 104 indicates a register number or a system memory address (r/m), and the operand 106 indicates a register number (reg). According to the operand 104, the designated key ID (Key_ID_S) is obtained from a register or the system memory (r/m). According to the operand 106, the designated address (Addr_S) is obtained from a register (reg). Referring to the instruction format 110, corresponding to the ISA instruction CFLUSHKEYID, the operand 104 indicates a register number (reg), and the operand 106 indicates a register number or a system memory address (r/m). According to the operand 104, the designated key ID (Key_ID_S) is obtained from a register (reg). According to the operand 106, the designated address (Addr_S) is obtained from a register or the system memory (r/m). Referring to the instruction format 112, corresponding to the ISA instruction CFLUSHKEYID, the operand 104 indicates a register number or a system memory address (r/m), and the operand 106 is an immediate data (imm16). According to the operand 104, the designated key ID (Key_ID_S) is obtained from a register or the system memory (r/m). According to the operand 106, an immediate data is obtained and interpreted as the designated address (Addr_S). Another instruction format of the ISA instruction CFLUSHKEYID identified by the opcode 102 may use just a single operand to indicate both the designated key ID (Key_ID_S) and the designated address (Addr_S). According to the single operand, the designated key ID (Key_ID_S) and the designated address (Addr_S) are obtained from a register (reg), the system memory (m), or interpreted from an immediate data. In some exemplary embodiments, some instructions for setting the registers, the system memory address, or the immediate data to get ready the designated key ID (Key_ID_S) and the designated address (Addr_S) are coded prior to the ISA instruction CFLUSHKEYID. The ISA instruction CFLUSHKEYID obtains the designated key ID (Key_ID_S) and the designated address (Addr_S) through its operands 104 and 106.

Figure 2:
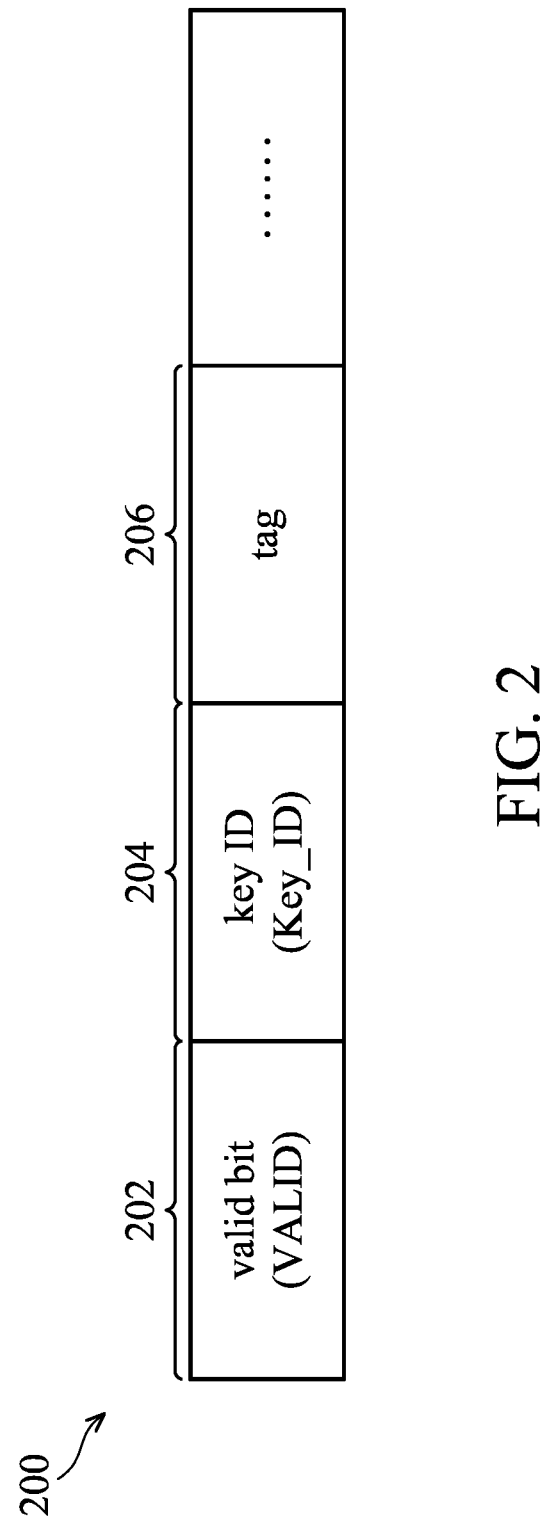
FIG. 2 illustrates a cache line format 200 of a hierarchical cache structure in accordance with an exemplary embodiment of the present application.

FIG. 2 illustrates a cache line format 200 of a hierarchical cache structure in accordance with an exemplary embodiment of the present application. Referring to the cache line format 200 of the hierarchical cache structure, the field 202 shows a valid bit (VALID), using '0' to indicate that the cache line is invalid, and using '1' to indicate that the cache line is valid. The field 204 shows a key ID Key_ID, and the field 206 shows a tag. The hierarchical cache structure may be searched for matching cache lines matching the designated key ID (Key_ID_S) and matching the designated physical address (PA).

The cache line searching may involve the following steps. In step 1, the hierarchical cache structure generates a tag and an index according to the designated physical address (PA). Specifically, a physical address (PA) may be divided into sections, wherein one section shows a tag and one section shows an index. Thus, the hierarchical cache structure may extract a tag and an index from the designated physical address (PA). In step 2, the hierarchical cache structure searches itself for matching cache lines matching the designated key ID Key_ID_S, the tag, and the index. Specifically, the hierarchical cache structure is first searched according to the index, and there may be at least one cache line matching the index. Referring to each cache line matching the index, a key ID Key_ID in the field 204 and a tag in the field 206 are compared with the designated key ID Key_ID_S and the tag corresponding to the designated physical address. If they are all the same, the checked cache line is the matching cache line. Otherwise, the checked cache line is not the matching cache line. As for how to search the hierarchical cache structure according to the index, it is the general knowledge of those skilled in the art, and details are not described here.

In the present application, to manage a hierarchical cache structure in granularity of keys, a key ID (Key_ID) field may be added to each cache line, and the hierarchical cache structure may be modified accordingly.

In an exemplary embodiment, the present application designs the microcode (UCODE) of the processor for execution of the instruction CFLUSHKEYID, and may further modify the processor hardware with the UCODE design.

Figure 3:
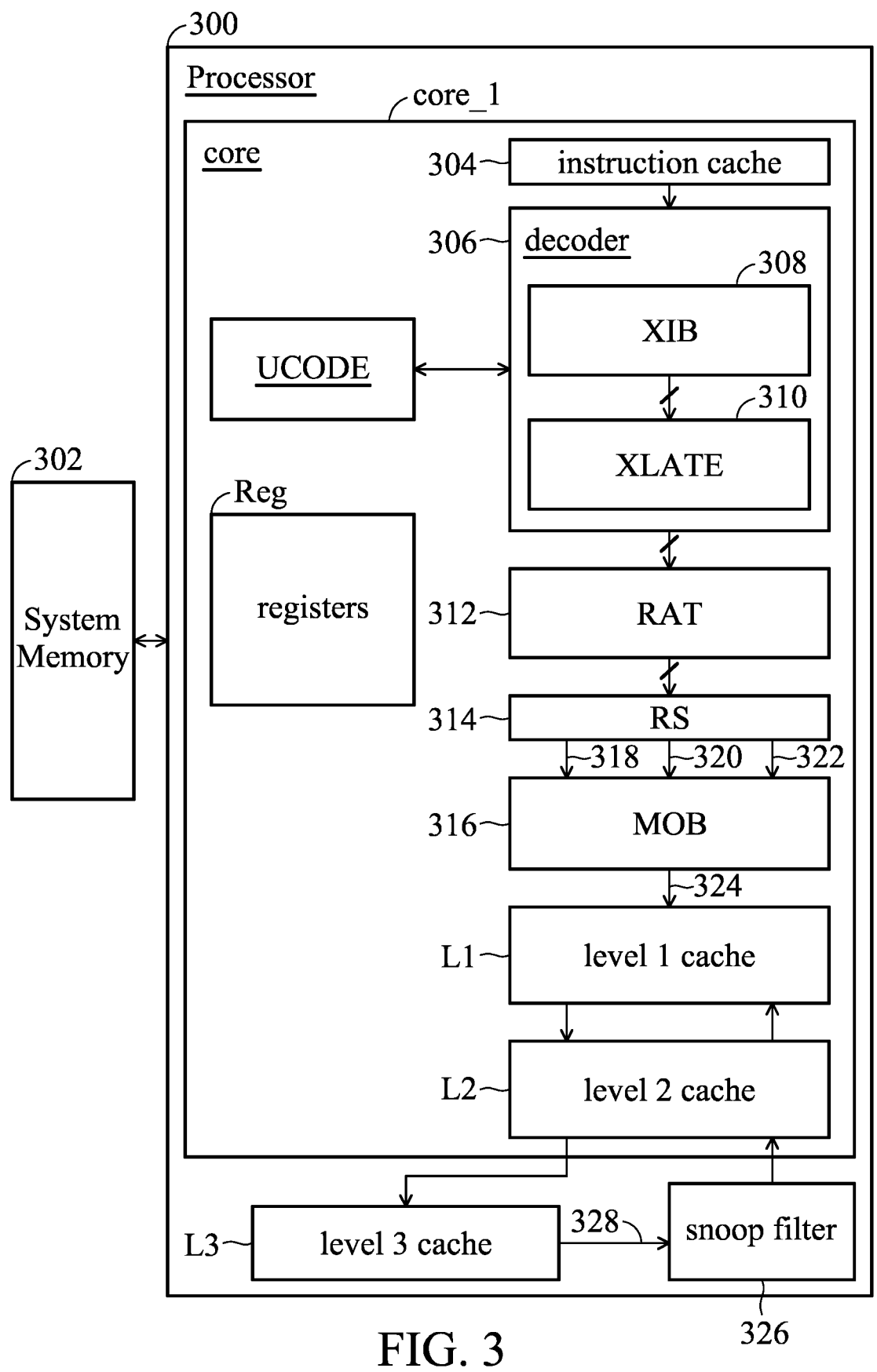
FIG. 3 is a block diagram illustrating a processor 300 and a core core_1 thereon in accordance with an exemplary embodiment of the present application.

FIG. 3 is a block diagram illustrating a processor 300 and a core core_1 thereon in accordance with an exemplary embodiment of the present application. The illustrated hierarchical cache structure includes level 1, 2 and 3 caches (L1, L2 and L3). The L1 and L2 form an in-core cache module of the core core_1. The level 3 cache L3 is the last level cache (LLC for short) that may be shared with the other cores.

After being loaded from a system memory 302 into an instruction cache 304, at least one instruction is decoded by a decoder 306, wherein an instruction CFLUSHKEYID is included in the at least one instruction. The decoder 306 includes an instruction buffer (XIB for short) 308 and an instruction translator (XLATE for short) 310. The instruction buffer (XIB) 308 identifies the instruction CFLUSHKEYID proposed in the present application, and the instruction translator (XLATE) 310 translates the instruction CFLUSHKEYID into at least one microinstruction that may be recognized by the pipelined hardware to drive the pipelined hardware to flush the matching cache lines in L1, L2 and L3. The matching cache lines matches the designated key ID Key_ID_S as well as the designated address Addr_S indicated by the instruction CFLUSHKEYID. In an exemplary embodiment, the XLATE 310 recognizes the opcode 102 of the instruction CFLUSHKEYID, and translates the instruction CFLUSHKEYID into at least one microinstruction, recognizable by the pipelined hardware, based on the microcode UCODE stored in a microcode memory. According to a register alias table (RAT) 312, the at least one microinstruction is stored in the reservation station (RS) 314 for further utilization. The at least one microinstruction includes a flushing microinstruction. According to the flushing microinstruction stored in the RS 314, a memory ordering buffer (MOB) 316 is triggered to operate the hierarchical cache structure to perform a flushing operation. In an exemplary embodiment, the decoded at least one microinstruction further includes microinstruction(s) for exception checking (e.g., privilege level checking), memory address jumping (e.g., jumping to the instruction following the ISA invalidation instruction), and so on.

The memory ordering buffer (MOB) 316 is generally used as a communication interface between the core core_1 and the memories (e.g., registers Reg, the L1, L2 and L3, and system memory 302). FIG. 3 specifically illustrates a microinstruction design in the present application, showing how to flush matching cache lines, matching the designated key ID (Key_ID_S) and the designated address (Addr_S), in the L1, L2, and L3 through the memory ordering buffer (MOB) 316.

As shown, the reservation station (RS) 314 outputs the flushing microinstruction (including the opcode 318, and operands 320 and 322) to the memory ordering buffer (MOB) 316. After identifying the opcode 318, as indicated by the operands 320 and 322, the designated key ID (Key_ID_S) and the designated address (Addr_S) are obtained from a register Reg or the system memory 302 through the communication interface implemented by the memory ordering buffer (MOB) 316. In another exemplary embodiments (112 of FIG. 1), the designated address (Addr_S) is interpreted from the immediate data (imm16). As mentioned above, in an exemplary embodiment, the instruction CFLUSHKEYID uses only one operand, and the operand may be divided into two sections of information, one section indicates the designated key ID (Key_ID_S), and the other section indicates the designated address (Addr_S). The operand may record a register number, a system memory address, or an immediate data. Through the operand, the designated key ID (Key_ID_S) and the designated address (Addr_S) are read from a register (reg) or the system memory (m), or interpreted from an immediate data (imm16). In an exemplary embodiment, the designated address Addr_S is a virtual address VA, and is translated to a physical address PA through the memory ordering buffer 316. Through the memory ordering buffer 316, a flushing request 324 is provided to the level 1 cache (L1), and then to the level 2 cache (L2), and finally to the level 3 cache (L3).

The flushing request 324 carries the designated key ID (Key_ID_S) and the physical address (PA) corresponding to the designated address (Addr_S). According to the designated key ID (Key_ID_S) and the physical address (PA) carried in the flushing request 324, the level 3 cache (L3) uses the aforementioned cache line searching method to find a matching cache line and flush it. Note that if the matching cache line has not been stored back to the system memory 302, storing the matching cache line back to the system memory 302 is required before flushing the matching cache line. In an exemplary embodiment, a valid bit (VALID) of the matching cache line is de-asserted to flush the matching cache line. In an exemplary embodiment, when no matching cache line is found from the level 3 cache (L3) according to the aforementioned cache line searching method, the level 3 cache (L3) does no further actions and the instruction CFLUSHKEYID is completed.

A symbol (hereinafter referred to as a matching symbol) of the matching cache line found from the level 3 cache (L3) will be used in searching the level 2 cache (L2) and the level 1 cache (L1). Generally, in a hierarchical cache structure, each cache line is marked with a symbol. At the different cache levels, the cache lines matching the same key ID and the same address are marked with the same symbol. In an exemplary embodiment, a symbol includes information of a key ID (Key_ID), a tag, an index, and the like. In another exemplary embodiment, a symbol includes information of physical address (PA).

The level 3 cache (L3) sends a snoop request 328 to a snoop filter 326, wherein the snoop request 328 carries a matching symbol. Such a snoop request carrying a matching symbol is provided to the level 2 cache (L2) through the snoop filter 326. The level 2 cache (L2) flushes a cache line with the same matching symbol, and further provides the snoop request carrying the matching symbol to the level 1 cache (L1). The level 1 cache (L1) also flushes a cache line with the same matching symbol. In this manner, in the whole hierarchical cache structure including L1, L2, and L3, all cache lines matching the designated key identifier (Key_ID_S) and the designated address (Addr_S) are indeed flushed.

Figure 4:
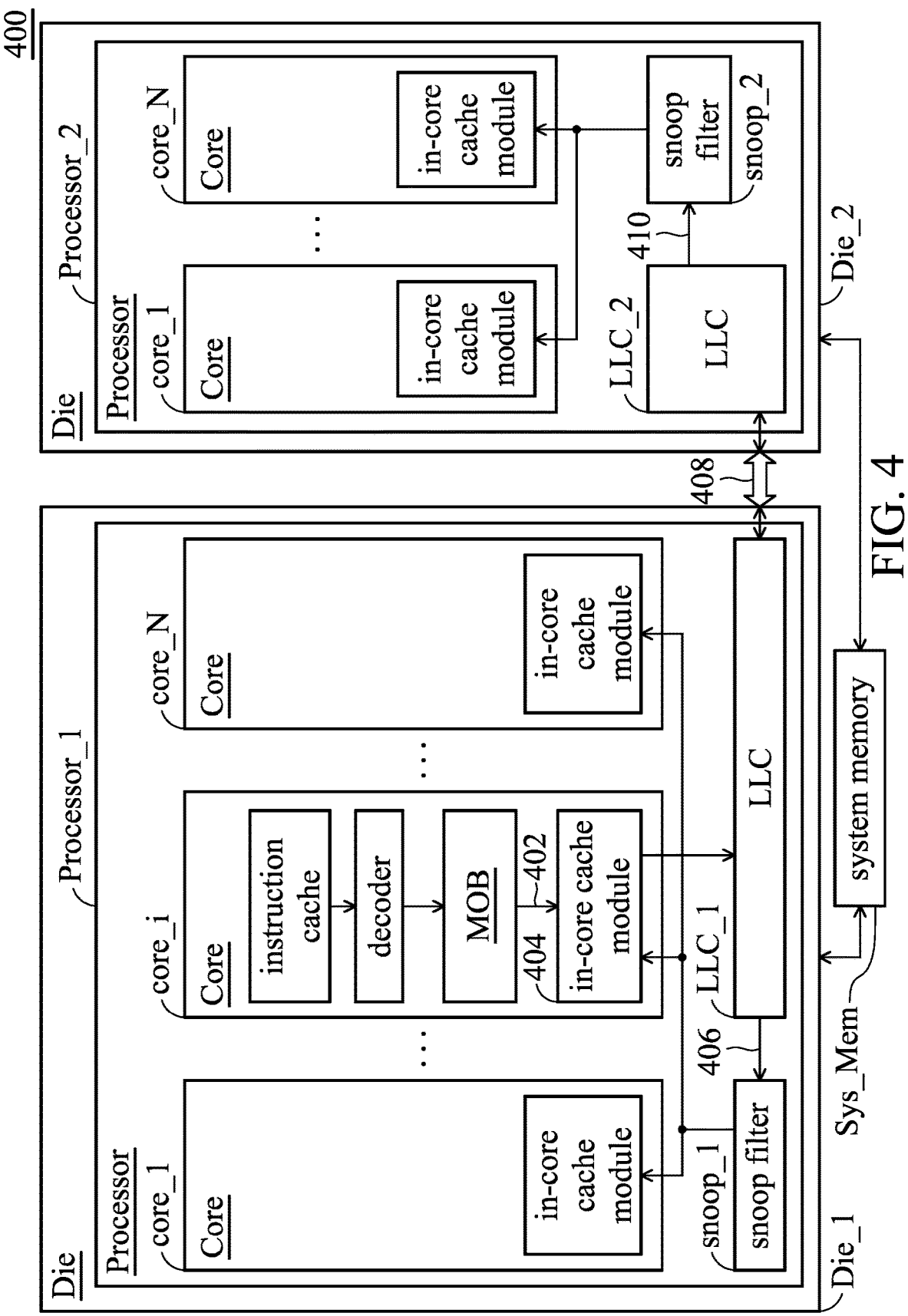
FIG. 4 illustrates a computer system 400 in accordance with an exemplary embodiment of the present application.

FIG. 4 illustrates a computer system 400 in accordance with an exemplary embodiment of the present application. The die Die_1 includes a processor Processor_1, and the die Die_2 includes a processor Proessor_2. Each processor Processor_1/Proessor_2 includes multiple cores core_1~core_N. Each core includes an in-core cache module (e.g., each formed by a level 1 cache L1 and a level 2 cache L2). In the processor Processor_1, the multiple cores core_1~core_N share the same last-level cache (e.g., the level 3 cache L3) LLC_1, and a snoop filter Snoop_1 is paired with the last-level cache LLC_1. In the processor Processor_2, the multiple cores core_1~core_N share the same last-level cache LLC_2, and a snoop filter Snoop_2 is paired with the last-level cache LLC_2. The two processors Processor_1 and Processor_2 on the two dies Die_1 and Die_2 share a system memory Sys_Mem. The illustration shows that a core core_1 of the processor Processor_1 on the die Die_1 executes the instruction CFLUSHKEYID proposed in the present application, which indicates a designated key ID (Key_ID_S) and a designated address (Addr_S).

Through the communication interface provided by the memory ordering buffer MOB, the core core_i transmits a flushing request 402 that indicates a designated key ID (Key_ID_S) and a physical address corresponding to a designated address (Addr_S) to an in-core cache module 404, and the in-core cache module 404 further passes the flushing request 402 to the last level cache LLC_1. According to the designated key ID (Key_ID_S) and the designated address (Addr_S) indicated by the flushing request 402, the last-level cache LLC_1 searches itself to find the matching cache line and flushes it. The last-level cache LLC_1 loads a symbol of the matching cache line to a snoop request 406 and provides the snoop request 406 to the snoop filter snoop_1. The snoop filter snoop_1 receives the snoop request 406 and passes it to all in-core cache modules of the different cores core_1~core_N of the processor Processor_1. Accordingly, the matching cache lines in the in-core cache modules of all cores core_1~core_N of the processor Processor_1 are flushed. In this way, in the processor Processor_1, all matching cache lines (matching the designated key ID (Key_ID_S) and the designated address (Addr_S)) in each of the in-core cache modules of the different cores core_1~core_N and in the last-level cache LLC_1 shared by all cores core_1~core_N are flushed consistently.

In particular, through a channel 408 between the die Die_1 and the die Die_2 (in one exemplary embodiment, the channel 408 is an internal bus), the last level cache LLC_1 provides the flushing request 402 (with the designated key ID Key_ID_S and the physical address (PA) corresponding to the designated address (Addr_S)) received from the in-core cache module 404 to the last level cache LLC_2. According to the designated key ID Key_ID_S and the designated address (Addr_S) indicated by the flushing request 402, the last-level cache LLC_2 searches itself to find a matching cache line and flushes it. A symbol of the matching cache line found from the last-level cache LLC_2 no doubt equals to the matching symbol determined by the last level cache LLC_1, and is carried by a snoop request 410. The snoop filter snoop_2 receives the snoop request 410 from the last-level cache LLC_2 and passes it to all in-core cache modules of the different cores core_1~core_N of the processor Processor_2. Accordingly, all matching cache lines in the in-core cache modules of the different cores core_1~core_N of the processor Processor_2 are flushed. In this way, in the processor Processor_2, all matching cache lines (matching the designated key ID (Key_ID_S) and the designated address (Addr_S)) in the in-core cache modules of the different cores core_1~core_N and in the last-level cache LLC_2 shared by all cores core_1~core_N are flushed consistently.

The technique of the present application flushes all matching cache lines (matching the designated key ID (Key_ID_S) and the designated address (Addr_S)) in the whole hierarchical cache structure of the entire computer system 400 without omission. Any use of an ISA instruction to complete the flushing of the hierarchical cache structure based on of the designated key ID (Key_ID_S) and the designated address (Addr_S) is within the field of the present application.

Based on the instruction format 108 of FIG. 1 and the techniques described in FIGS. 1 to 4, how an instruction CFLUSHKEYID in the present application is executed is described in the following. In an exemplary embodiment, the sequence of instructions to be executed is:

MOV EAX,KeyID     (1)

MOV EBX,ProcessMemory_VA     (2)

CFLUSHKEYID EAX,EBX     (3)

After being compiled, the instructions (1), (2), and (3) are loaded into the system memory 302 in FIG. 3. The processor 300 sequentially reads the instructions (1) and (2) from the system memory 302 and executes them. A key ID KeyID is loaded into a register EAX. A virtual address ProcessMemory_VA is loaded into a register EBX. Then, the processor 300 executes the instruction (3).

Referring to FIG. 3, the processor 300 loads the instruction (3) from the system memory 302 into the instruction cache 304. The decoder 306 translates the instruction (3) into at least one microinstruction according to the recognized opcode 102 shown in FIG. 1, and stores the at least one microinstruction into a corresponding reserved station (RS) 314 as indicated by a register alias table (RAT) 312. When a flushing microinstruction in the at least one microinstruction satisfies an execution condition, the reservation station (RS) 314 provides the flushing microinstruction to the memory ordering buffer (MOB) 316 for execution. After recognizing the opcode 318, the memory ordering buffer (MOB) 316 obtains the key ID KeyID and the virtual address ProcessMemory_VA from the registers EAX and EBX according to the operands 320 and 322. The memory ordering buffer (MOB) 316 translates the virtual address ProcessMemory_VA to a physical address ProcessMemory_PA. Then, the memory order buffer (MOB) 316 generates a flushing request 324 carrying the key ID KeyID and the physical address ProcessMemory_PA, and passes the flushing request 324 to the level 1 cache (L1), the level 2 cache (L2), and finally to the level 3 cache (L3).

Referring to FIGS. 2 and 3, the level 3 cache (L3) obtains a tag ProcessMemory_TAG and an index ProcessMemory_INDEX corresponding to the physical address ProcessMemory_PA. The level 3 cache (L3) first searches itself according to the index ProcessMemory_INDEX for at least one valid cache line, and then compares the key ID (Key_ID 204) and the tag (206) of the valid cache lines with the key ID KeyID and the tag ProcessMemory_TAG to determine the matching cache line. Then the matching cache line is flushed. The level 3 cache (L3) sends a snoop request 328 to the snoop filter 326, wherein the snoop request 328 carries a matching symbol that contains information of the key ID KeyID, the tag ProcessMemory_TAG, the index ProcessMemory_INDEX, etc. Such a snoop request with a matching symbol is provided to the level 2 cache (L2) through the snoop filter 326. According to the matching symbol, the level 2 cache (L2) searches itself for a matching cache line and flushes it. Then, the level 2 cache (L2) passes the flushing request with the matching symbol to the level 1 cache (L1). According to the matching symbol, the level 1 cache (L1) searches itself for a matching cache line and flushes it. In this exemplary embodiment, all matching cache lines (matching the key ID KeyID and the virtual address ProcessMemory_VA) in the whole hierarchical cache structure including L1, L2 and L3 are flushed consistently.

Referring to FIG. 4, it is assumed that the core core_i of the processor Processor_1 of the computer system 400 executes the aforementioned sequence of instructions (1), (2), and (3). Through the communication interface built through the memory ordering buffer MOB, the core core_i transmits a flushing request 402 that indicates the key ID KeyID and the physical address ProcessMemory_PA corresponding to the virtual address ProcessMemory_VA to the in-core cache module 404, and then to the last level cache LLC_1. According to the key ID KeyID and the physical address ProcessMemory_PA indicated by the flushing request 402, the last-level cache LLC_1 searches itself for a matching cache line and flushes it. A matching symbol (containing information of the key ID KeyID, the tag ProcessMemory_TAG, the index ProcessMemory_INDEX, and other information) of the matching cache line found from the last-level cache LLC_1 may be carried by a snoop request 406. The last-level cache LLC_1 provides the snoop request 406 to the snoop filter snoop_1, and then the snoop filter snoop_1 passes the snoop request 406 to the in-core cache modules of the cores core_1~core_N in the processor Processor_1. Thus, all matching cache lines (matching the key ID KeyID and the virtual address ProcessMemory_VA) in the in-core cache modules of the different cores core_1~core_N of the processor Processor_1 and in the last-level cache LLC_1 are flushed consistently In addition, through the channel 408 between the die Die_1 and the die Die_2 (in an exemplary embodiment, the channel 408 is an internal bus), the last level cache LLC_1 outputs the flushing request 402 (received from the in-core cache module 404 and carrying the designated key ID KEYID and the physical address ProcessMemory_PA of the designated virtual address ProcessMemory_VA) to the last level cache LLC_2. According to the designated key ID KEYID and the physical address ProcessMemory_PA carried by the flushing request 402, the last-level cache LLC_2 searches itself for the matching cache line and flushes it. The last-level cache LLC_2 finds a matching symbol (containing information of a key ID KeyID, a tag ProcessMemory_TAG, an index ProcessMemory_INDEX, and so on) which is the same as that found by the last-level cache LLC_1. The matching symbol is carried by a flushing request 410 to be passed from the last-level cache LLC_2 to the snoop filter snoop_2. The snoop filter snoop_2 passes the snoop request 410 to all in-core modules of the different cores core_1 to core_N of the processor Processor_2. In this manner, the matching cache lines (matching the designated key ID KeyID and the designated virtual address ProcessMemory_VA) in the in-core cache modules of all cores core_1~core_N of the processor Processor_2 as well as the matching cache lines in the last-level cache LLC_2 shared by the different cores core_1~core_N are flushed consistently.

According to the technology of the present application, the hierarchical cache structure is managed in granularity of the keys. When a total memory encryption function is enabled, the operating system may manage the hierarchical cache structure in granularity of the keys.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, flushing a hierarchical cache structure based on a designated key identification code and a designated address, comprising:
    a first processor fabricated on a first die, comprising a first core, wherein the first core comprises a decoder, a memory ordering buffer, and a first in-core cache module; and
    a first last-level cache, fabricated in the first processor;
    wherein:
    in response to an instruction of an instruction set architecture that is provided to flush the hierarchical cache structure based on the designated key identification code and the designated address, the decoder outputs at least one microinstruction;
    according to the at least one microinstruction, a flushing request with the designated key identification code and the designated address is provided to the first in-core cache module through the memory ordering buffer, and then is provided to the first last-level cache by the first in-core cache module;
    in response to the flushing request, the first last-level cache searches the first last-level cache for a matching cache line that matches the designated key identification code and the designated address, and flushes the matching cache line.

2. The computer system as claimed in claim 1, further comprising:
    a first snoop filter, fabricated in the first processor;
    wherein:
    the first last-level cache provides a first snoop request to the first snoop filter, and the first snoop filter provides the first snoop request to the first in-core cache module;
    the first snoop request carries a matching symbol;
    in the first in-core cache module and the first last-level cache, cache lines matching the designated key identification code and the designated address all carry the matching symbol; and
    first in-core cache module searches the first in-core cache module based on the matching symbol carried in the first snoop request to find and flush matching cache lines matching the designated key identification code and the designated address in the first in-core cache module.

3. The computer system as claimed in claim 2, wherein:
    the first processor further comprises a second core, and the second core comprises a second in-core cache module;
    the first snoop filter further provides the first snoop request to the second in-core cache module;
    the second in-core cache module searches the second in-core cache module based on the matching symbol carried in the first snoop request to find and flush matching cache lines matching the designated key identification code and the designated address in the second in-core cache module.

4. The computer system as claimed in claim 1, wherein:
    the first last-level cache generates a tag and an index according to a physical address corresponding to the designated address; and
    in the first last-level cache, the matching cache line has cache line information matching the designated key identification code, the tag and the index.

5. The computer system as claimed in claim 1, further comprising:
    a second processor fabricated on a second die, comprising a third core, wherein the third core comprises a third in-core cache module; and
    a second last-level cache module fabricated in the second processor;
    wherein:
    through a channel between the first die and the second die, the first last-level cache provides the flushing request received from the first in-core cache module to the second last-level cache;
    in response to the flushing request, the second last-level cache searches the second last-level cache for a matching cache line that matches the designated key identification code and the designated address in the second last-level cache, and flushes it the matching cache line found from the second last-level cache.

6. The computer system as claimed in claim 5, further comprising:
    a second snoop filter, fabricated in the second processor;
    wherein:
    the second last-level cache provides the second snoop filter with a second snoop request, and the second snoop filter provides the second snoop request to the third in-core cache module;
    the second snoop request carries a matching symbol;
    in the third in-core cache module and the second last-level cache, cache lines matching the designated key identification code and the designated address all carry the matching symbol; and
    the third in-core cache module searches the third in-core cache module based on the matching symbol carried in the second snoop request to find and flush matching cache lines matching the designated key identification code and the designated address in the third in-core cache module.

7. A processor, flushing a hierarchical cache structure based on a designated key identification code and a designated address, comprising:

a first core, including a decoder, a memory ordering buffer, and a first in-core cache module; and a last-level cache;

wherein:

in response to an instruction of an instruction set architecture that is provided to flush the hierarchical cache structure based on the designated key identification code and the designated address, the decoder outputs at least one microinstruction;

according to the at least one microinstruction, a flushing request with the designated key identification code and the designated address is provided to the first in-core cache module through the memory ordering buffer, and then is provided to the last-level cache by the first in-core cache module;

in response to the flushing request, the last-level cache searches itself the last-level cache for a matching cache line that matches the designated key identification code and the designated address, and flushes the matching cache line.

8. The processor as claimed in claim 7, further comprising:

a snoop filter;

wherein:

the last-level cache provides a snoop request to the snoop filter, and the snoop filter provides the snoop request to the first in-core cache module;

the snoop request carries a matching symbol;

in the first in-core cache module and the last-level cache, cache lines matching the designated key identification code and the designated address all carry the matching symbol; and the first in-core cache module searches the first in-core cache module based on the matching symbol carried in the snoop request to find and flush matching cache lines matching the designated key identification code and the designated address in the first in-core cache module.

9. The processor as claimed in claim 8, wherein:

the first in-core cache includes a level 1 cache and a level 2 cache, and the last-level cache is a level 3 cache; and the level 2 cache receives the snoop request from the snoop filter and provides the snoop request to the level 1 cache.

10. The processor as claimed in claim 9, wherein:

the level 2 cache searches the level 2 cache based on the matching symbol carried in the snoop request to find and flush a matching cache line matching the designated key identification code and the designated address in the level 2 cache; and the level 1 cache searches the level 1 cache based on the matching symbol carried in the snoop request to find and flush a matching cache line matching the designated key identification code and the designated address in the first-level cache.

11. The processor as claimed in claim 8, further comprising:

a second core, including a second in-core cache module;

wherein:

the snoop filter further provides the snoop request to the second in-core cache module;

the second in-core cache module searches the second in-core cache module based on the matching symbol carried in the snoop request to find and flush matching cache lines matching the designated key identification code and the designated address in the second in-core cache module.

12. The processor as claimed in claim 7, wherein:

the first in-core cache includes a level 1 cache and a level 2 cache; and the last-level cache is a level 3 cache.

13. The processor as claimed in claim 12, wherein:

the flushing request is provided to the level 2 cache by the level 1 cache, and then is further provided to the level 3 cache by the level 2 cache.

14. The processor as claimed in claim 7, wherein:

the last-level cache generates a tag and an index according to a physical address corresponding to the designated address; and in the last-level cache, the matching cache line has cache line information matching the designated key identification code, the tag and the index.

15. A method for flushing a hierarchical cache structure based on a designated key identification code and a designated address, comprising:

in response to an instruction of an instruction set architecture that is provided to flush the hierarchical cache structure based on the designated key identification code and the designated address, operating a decoder to output at least one microinstruction, wherein the decoder is provided by a first core of a first processor on a first die, and the first core further comprises a memory ordering buffer and a first in-core cache module; and according to the at least one microinstruction, providing a flushing request that carries the designated key identification code and the designated address to the first in-core cache module through the memory ordering buffer, and then operating the first in-core cache module to provide the flushing request to a first last-level cache shared by a plurality of cores of the first processor; and in response to the flushing request, operating the first last-level cache to search itself the first last-level cache for a matching cache line that matches the designated key identification code and the designated address, and flush the matching cache line.

16. The method as claimed in claim 15, further comprising:

operating the first last-level cache to provide a first snoop request to a first snoop filter of the first processor, and operating the first snoop filter to provide the first snoop request to the first in-core cache module, wherein the first snoop request carries a matching symbol, and, in the first in-core cache module and the first last-level cache, cache lines matching the designated key identification code and the designated address all carry the matching symbol; and operating the first in-core cache module to search the first in-core cache module based on the matching symbol carried in the first snoop request to find and flush matching cache lines matching the designated key identification code and the designated address in the first in-core cache module.

17. The method as claimed in claim 16, further comprising:

operating a level 2 cache of the first in-core cache module to receive the first snoop request from the first snoop filter; and operating the level 2 cache to provide the first snoop request to a level 1 cache of the first in-core cache module.

18. The method as claimed in claim 17, further comprising:

operating the level 2 cache to search the level 2 cache based on the matching symbol carried in the first snoop request to find and flush a matching cache line matching the designated key identification code and the designated address in the level 2 cache; and operating the level 1 cache to search the level 1 cache based on the matching symbol carried in the first snoop request to find and flush a matching cache line matching the designated key identification code and the designated address in the level 1 cache.

19. The method as claimed in claim 16, further comprising:

operating the first snoop filter to provide the first snoop request to a second in-core cache module of a second core, wherein the second core is fabricated in the first processor;

operating the second in-core cache module to search the second in-core cache module based on the matching symbol carried in the first snoop request to find and flush matching cache lines matching the designated key identification code and the designated address in the second in-core cache module.

20. The method as claimed in claim 15, wherein:

the first in-core cache module comprises a level 1 cache and a level 2 cache;

the first last-level cache is a level 3 cache; and the flushing request is provided to the level 2 cache by the level 1 cache, and then is further provided to the level 3 cache by the level 2 cache.

21. The method as claimed in claim 15, wherein:

the first last-level cache generates a tag and an index according to a physical address corresponding to the designated address; and in the first last-level cache, the matching cache line has cache line information matching the designated key identification code, the tag and the index.

22. The method as claimed in claim 15, further comprising:

operating the first last-level cache to provide the flushing request received from the first in-core cache module to a second last-level cache shared by a plurality of cores of a second processor on a second die, wherein a channel between the first die and the second die is used to transfer the flushing request; and in response to the flushing request, operating the second last-level cache to search the second last-level cache to find and flush a matching cache line matching the designated key identification code and the designated address.

23. The method as claimed in claim 22, further comprising:

operating the second last-level cache to provide a second snoop request to a second snoop filter of the second processor;

operating the second snoop filter to provide the second snoop request to a third in-core cache module of a third core of the second processor, wherein the second snoop request carries a matching symbol and, in the third in-core cache module and the second last-level cache, cache lines matching the designated key identification code and the designated address all carry the matching symbol; and operating the third in-core cache module to search the third in-core cache module based on the matching symbol carried in the second snoop request to find and flush matching cache lines matching the designated key identification code and the designated address in the third in-core cache module.

\* \* \* \* \*